US009865944B2

(12) United States Patent
Chen et al.

(10) Patent No.: US 9,865,944 B2
(45) Date of Patent: Jan. 9, 2018

(54) OUTPUT TERMINAL, INSULATOR SLEEVE, COVER FOR AC GENERATOR AND ASSEMBLY THEREOF

(71) Applicant: Victory Industrial Corporation, New Taipei (TW)

(72) Inventors: Charles Jack Chen, New Taipei (TW); Hung-Chih Chang, New Taipei (TW); Chun-Yuan Wang, New Taipei (TW); Ping-Feng Tsai, New Taipei (TW)

(73) Assignee: Victory Industrial Corporation, New Taipei (TW)

( * ) Notice: Subject to any disclaimer, the term of this patent is extended or adjusted under 35 U.S.C. 154(b) by 0 days.

(21) Appl. No.: 15/456,526

(22) Filed: Mar. 12, 2017

(65) Prior Publication Data

US 2017/0271790 A1    Sep. 21, 2017

(30) Foreign Application Priority Data

Mar. 17, 2016 (TW) .............................. 105108325 A

(51) Int. Cl.
*H01R 9/18* (2006.01)
*H01R 4/38* (2006.01)
*H01R 39/38* (2006.01)

(52) U.S. Cl.
CPC ................. *H01R 9/18* (2013.01); *H01R 4/38* (2013.01); *H01R 39/386* (2013.01)

(58) Field of Classification Search
CPC ....................................................... H01R 9/18
See application file for complete search history.

(56) References Cited

U.S. PATENT DOCUMENTS

| | | | | | |
|---|---|---|---|---|---|
| 3,850,501 A | * | 11/1974 | Butterfield | ............. | H01B 17/58 439/196 |
| 4,050,771 A | * | 9/1977 | Watson | .................... | H01R 9/18 403/408.1 |
| 4,843,267 A | * | 6/1989 | Kaneyuki | ............... | H02K 5/225 310/68 D |
| 5,233,246 A | * | 8/1993 | Yockey | .................. | H02K 5/225 310/68 D |
| 5,331,231 A | * | 7/1994 | Koplin | .................. | H01L 25/115 257/E25.026 |
| 5,712,517 A | * | 1/1998 | Schmidt | ................ | H01L 25/112 257/E25.025 |

(Continued)

FOREIGN PATENT DOCUMENTS

| | | |
|---|---|---|
| CN | 1585231 A | 2/2005 |
| CN | 1866693 A | 11/2006 |
| TW | 245180 | 4/1995 |

*Primary Examiner* — James Harvey
(74) *Attorney, Agent, or Firm* — Clifford Perry

(57) ABSTRACT

An output terminal for a vehicle AC generator is provided. The output terminal comprises: a bolt and a cylinder nut. The bolt has outer threads and is inserted through a through hole of a rectifier unit. The cylinder nut has inner threads, which engage with the outer threads of the bolt so that the cylinder nut surrounds the outer circumference of the bolt and fixes the bolt to the rectifier unit. The cylinder nut has a recess in its outer circumference. An insulating sleeve may be provided on the output terminal. The insulating sleeve has at least an internal protrusion for being received in and engaged with the recess of the cylinder nut.

15 Claims, 6 Drawing Sheets

(56) References Cited

U.S. PATENT DOCUMENTS

| | | | | |
|---|---|---|---|---|
| 5,924,897 A * | 7/1999 | Abadia | ............... | H01R 39/386 |
| | | | | 439/699.1 |
| 6,150,741 A * | 11/2000 | Hayashi | ............... | H02K 5/225 |
| | | | | 310/68 D |
| 6,395,985 B1 * | 5/2002 | Djeddah | ............... | H01B 17/30 |
| | | | | 174/59 |
| 2002/0113510 A1 * | 8/2002 | Morikaku | ............ | H02K 11/046 |
| | | | | 310/91 |
| 2003/0071711 A1 * | 4/2003 | Haupt | ............... | H01H 85/0241 |
| | | | | 337/159 |
| 2006/0273671 A1 * | 12/2006 | Oohashi | ............... | H02K 11/046 |
| | | | | 310/68 D |
| 2014/0265671 A1 * | 9/2014 | Bradfield | ............... | H02K 5/225 |
| | | | | 310/71 |

* cited by examiner

US 9,865,944 B2

OUTPUT TERMINAL, INSULATOR SLEEVE, COVER FOR AC GENERATOR AND ASSEMBLY THEREOF

BACKGROUND

Field of the Invention

The present invention relates to an output terminal, an insulator sleeve, a cover for an AC generator and an assembly thereof.

Description of Related Art

An alternating-current generator is used for converting mechanical energy into alternating-current electric energy. In a vehicle alternating-current generator, the output power of an engine drives a rotor of the generator to rotate within a stator to convert mechanical energy of the engine into electric energy to charge a storage battery, which then supplies electric energy to electrical parts of a vehicle.

A vehicle alternating-current generator typically has an annular stator and a rotor. By means of rapid rotation of the rotor in the annular stator, magnetic fields are formed by wires wound on the annular stator so as to generate an induced electromotive force (voltage) in the wires and an inductive current. In general, the current generated is an alternative current (AC), which periodically reverses direction. In order to provide a direct current (DC) that flows in only one direction to a battery and some other components of a vehicle, a rectifier is required to convert the AC to DC. Furthermore, a vehicle AC generator contains a housing for accommodating the annular stator, the rotor, and the rectifier unit. The housing is usually formed with a cover that covers the rectifier unit and a shell that covers the annular stator and the rotor. The cover is assembled with the shell to contain them therein. The rectifier unit has an output terminal that protrudes out of the cover for outputting an electrical current. To avoid accidental contact with the output terminal, an insulating sleeve is usually used over the output terminal.

A conventional output terminal, insulator sleeve and cover assembly for vehicle are disclosed in U.S. Pat. No. 6,150,741, in which the output terminal is sleeved with an insulating sleeve The sleeved output terminal is held between a protective cover and a shell. However, in such a structure, the installment or detachment of the insulating sleeve is difficult, requiring disengagement of the protective cover and the shell beforehand, resulting in inefficiency of AC generator assembly.

Given the above, there is a need for an output terminal, insulator sleeve and cover assembly in which the insulating sleeve can be easily and conveniently installed to and detached from an output terminal of a rectifier unit and a protective cover of an engine, and at the same time is well secured in position and will not become loosened due to vehicle vibration.

BRIEF SUMMARY OF THE INVENTION

In one embodiment of the invention, an output terminal for a vehicle AC generator is provided. The output terminal comprises: a bolt and a cylinder nut. The bolt has outer threads and is inserted through a through hole of a rectifier unit. The cylinder nut has inner threads, which engage with the outer threads of the bolt so that the cylinder nut surrounds the outer circumference of the bolt and fixes the bolt to the rectifier unit. The cylinder nut has a recess in its outer circumference.

In another embodiment of the invention, an insulating sleeve is additionally provided to the above embodiment. The insulating sleeve has a through hole therein for installation on the output terminal and for an end of the bolt to be exposed outside of the insulating sleeve.

In a further embodiment, a protective cover is additionally provided to the above other embodiment to form an assembly. The protective cover is for enwrapping the rectifier unit, and the output terminal protrudes from the protective cover through an opening thereof.

DETAILED DESCRIPTION OF THE EXEMPLARY EMBODIMENTS

Figure 1:
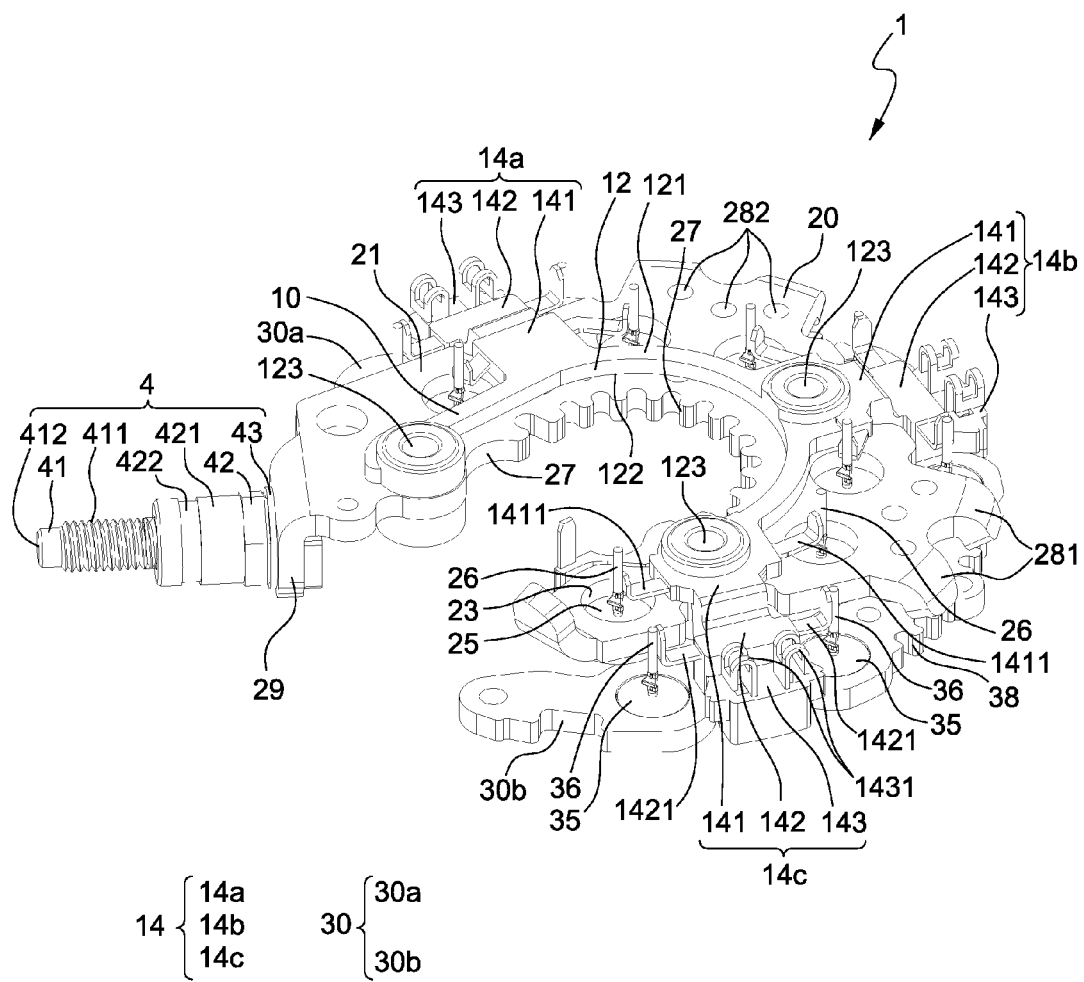
FIG. 1 is a perspective view of a rectifier unit of an AC generator for a vehicle according to an embodiment of the present invention.

The characteristics, subject matter, advantages, and effects of the present invention are detailed hereinafter by reference to embodiments of the present invention and the accompanying drawings. It is understood that the drawings referred to in the following description are intended only for purposes of illustration and do not necessarily show the actual proportion and precise arrangement of the embodiments. Therefore, the proportion and arrangement shown in the drawings should not be construed as limiting or restricting the scope of the present invention.

Figure 2:
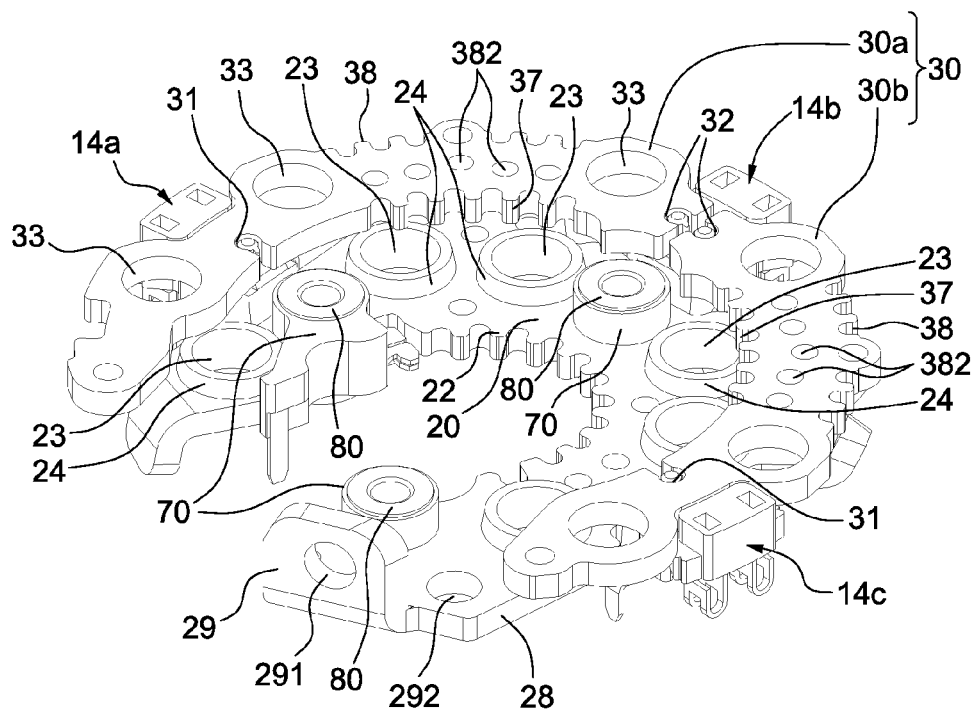
FIG. 2 is another perspective view of the rectifier unit of the embodiment wherein the output terminals and the diodes thereof are omitted.
Figure 3:
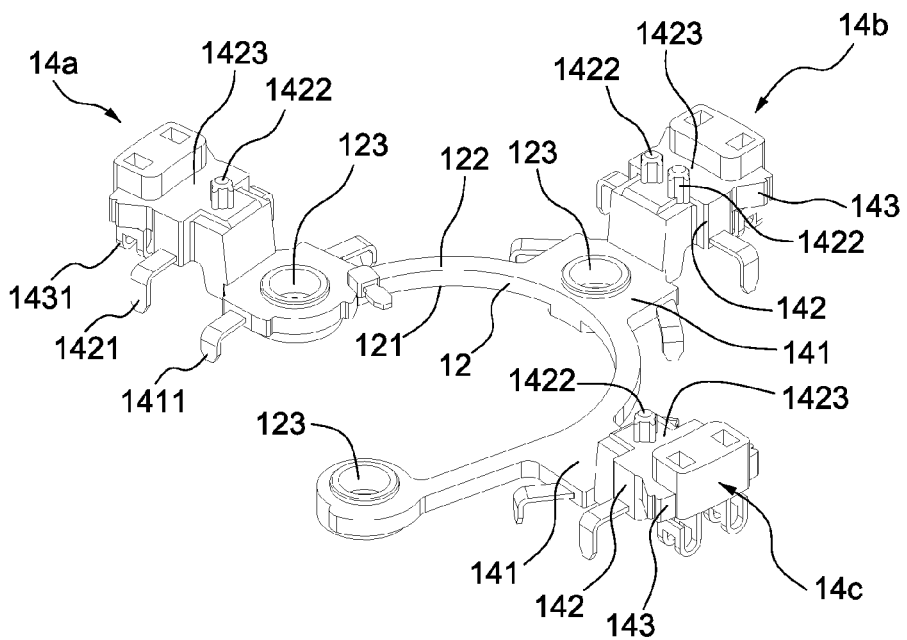
FIG. 3 is a schematic view of a connection unit of the rectifier unit of the embodiment.

FIG. 1 is a perspective view of a rectifier unit 1 of an AC generator for a vehicle according to an embodiment of the present invention. The descriptions regarding the orientations of the elements (such as upper, lower, upward or downward) described in the following use the orientations shown in FIG. 1 as datum. As shown in FIGS. 1 and 2, the rectifier unit 1 comprises: a connection unit 10, a positive cooling fin 20 and a negative cooling fin 30. The connection unit 10 has a generally U-shaped frame 12. Referring to FIG. 3, the generally U-shaped frame 12 includes an upper surface 121, a lower surface 122 and a plurality of mounting holes 123 formed therein. The connection unit 10 has a first terminal member 14a, a second terminal member 14b and a third terminal member 14c disposed thereon. As shown in FIGS. 1 and 3, each of the first, second and third terminal members 14a, 14b and 14c has a stepped structure, which is composed of a first step 141, a second step 142 and a third step 143 in sequence. The first step 141 protrudes radially outward from the frame 12 and is generally in the shape of a sheet. Preferably, the first step 141 is coplanar with the upper surface 121 of the frame. From FIG. 1, the second step 142 is one step lower than the first step 141 and the third step 143 is one step lower than the second step 142. The first step 141 has a first height difference with the second step 142 and the second step 142 has a second height difference with the third step 143, wherein the first height difference is larger than the second height difference.

FIG. 3 shows the opposite side of the connection unit 10 shown in FIG. 1. Referring to FIGS. 1 and 3, a pair of first pins 1411 extend laterally from both sides of the first step 141, respectively, and are then bent upward, a pair of second pins 1421 extends laterally from both sides of the second step 142, respectively, and is then bent upward, and a pair of third pins 1431 is disposed at the upward side of the third step 143. Each of the first terminal member 14a and the third terminal member 14c disposed at two ends of the connection unit 10 has a cylinder 1422 protruding from the lower surface of the second step 142 thereof. The lower surface of the third step 143 of each of the first terminal member 14a and the third terminal member 14c is lower than the lower surface of the second step 142 of each of the first terminal member 14a and the third terminal member 14c. A space 1423 is provided between the cylinder 1422 and a side of the third step 143 of each of the first terminal member 14a and the third terminal member 14c. Furthermore, the second terminal member 14b disposed between the first and the second terminal members 14a, 14c has a pair of parallel cylinders 1422 protruding from the lower surface of the second step 142 thereof. The lower surface of the third step 143 of the second terminal member 14b is lower than the lower surface of the second step 142 of each of the second terminal member 14b. A space 1423 is provided between the cylinders 1422 and a side of the third step 143 of the second terminal member 14b.

Referring to FIGS. 1 and 2, the positive cooling fin 20 of the rectifier unit 1 is mounted at a first portion of the connection unit 10 through a plurality of mounting holes 123 in the frame 12 of the connection unit 10. Specifically, when the positive cooling fin 20 is mounted to the frame 12 of the connection unit 10, each of a plurality of mounting holes of the positive cooling fin 20 is aligned with a corresponding mounting hole 123 in the frame 12 of the connection unit 10, a ring-shaped insulator 70 is provided at the below of each of the plurality of mounting holes of the positive cooling fin 20, and then a rivet 80 is inserted through the mounting hole 123 in the frame 12 of the connection unit 10, the mounting hole of the positive cooling fin 20, and the insulator 70 and is deformed so that they are riveted together. After the positive cooling fin 20 is mounted to the connection unit 10, a first surface 21 of the positive cooling fin 20 that faces upwards contacts a lower surface 122 of the frame 12 of the connection unit 10 that faces downwards, and an upper surface of the insulator 70 at least partially contacts a second surface 22 of the positive cooling fin 20 that faces downwards.

Furthermore, the positive cooling fin 20 has a plurality of through holes 23 therein. In the preferred embodiment shown in FIG. 2, there are six through holes 23 in the positive cooling fin 20. After the positive cooling fin 20 are assembled with the connection unit 10, each of the six through holes 23 in the positive cooling fin 20 is respectively disposed at two sides of the first stage 141 of each first, second and third terminal member 14a, 14b and 14c of the connection unit 10. Furthermore, each of the plurality of through holes 23 of the positive cooling fin 20 extends from a first surface 21 of the positive cooling fin 20 to an end of an annular flange 24 protruding from a second surface 22 of the positive cooling fin 20, wherein the second surface 22 of the positive cooling fin 20 is opposite the first surface 21 of the positive cooling fin 20. Each of the plurality of through holes 23 has a positive-side diode 25 received therein, which is in the shape of a disc. As shown in FIG. 1, a surface of the positive-side diode 25 in the through hole 23 is recessed from the first surface 22 of the positive cooling fin 20. In an alternative embodiment, the surface of the positive-side diode 25 in the through hole 23 is flush with the first surface 22 of the positive cooling fin 20. In addition, each positive-side diode 25 received in the plurality of through holes 23 of the positive cooling fin 20 has a pin 26 extending upward from the positive-side diode 25 and connects with a contact 1411 extending from a side of the first step 141 of the corresponding one of the plurality of terminal members 14a, 14b, 14c. Where the surface of the positive-side diode 25 in the through hole 23 is recessed from the first surface 22 of the positive cooling fin 20, the latitude of the pin 26 is lower than that where the surface of the positive-side diode 25 is flush with the first surface 22 of the positive cooling fin 20. Thus, the former can reduce the overall height of the rectifier unit 1, and the size of an AC generator containing the same can also be reduced accordingly.

Figure 4:
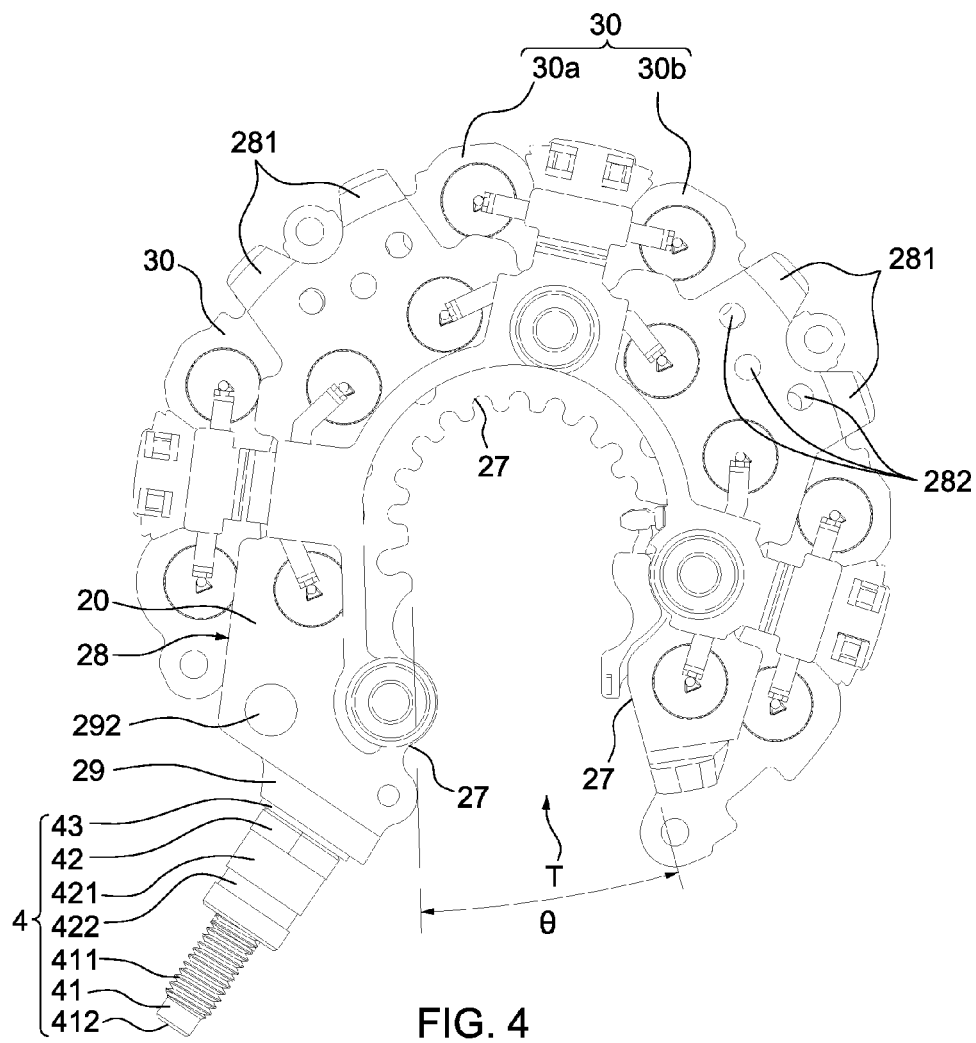
FIG. 4 is a top view of the rectifier unit shown in FIG. 1.

FIG. 4 is a top view of the rectifier unit shown in FIG. 1. Please refer to FIGS. 1 and 4. The positive cooling fin 20 is generally a disc-like shape with an opening T. The opening T is formed along a radial direction of the positive cooling fin 20 and its width expands outwards from the inner periphery 27 of the positive cooling fin 20 and forms an angle θ, which is around 14°. In alternative embodiments, the angle θ ranges from 5° to 60°. The inner periphery 27 of the positive cooling fin has a jagged shape for increasing the heat-dissipation surface of the positive cooling fin 20. The outer circumference 28 of the positive cooling fin 20 comprises a plurality of flow-guiding tabs 281 extending downward therefrom. The flow-guiding tabs 281 guide air-flow coming from a fan of the AC generator for dissipating heat so that the air-flow can be effectively guided to the internal cavity of the AC generator. To further enhance the efficiency of dissipating heat from the rectifier unit 1, a plurality of heat-dissipation holes 282 are provided in the positive cooling fin 20.

Figure 5:
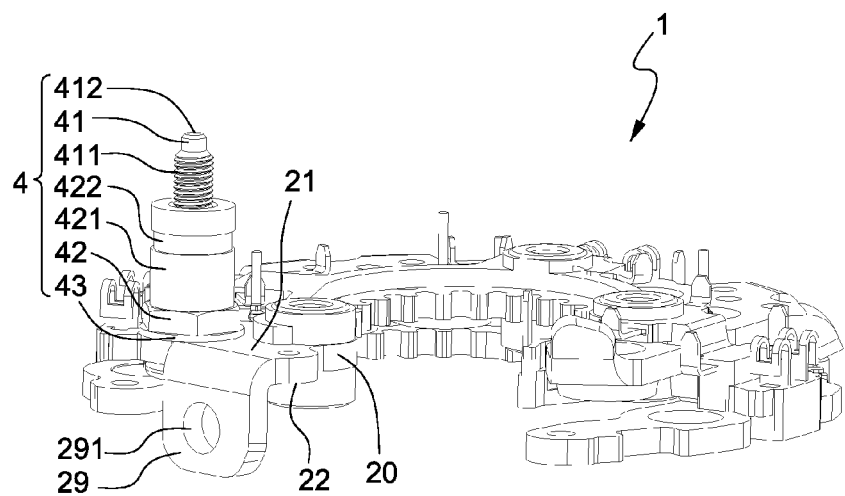
FIG. 5 is a schematic view showing an upward-oriented output terminal of a rectifier unit of an AC generator for a vehicle, which is fixed in the positive cooling fin according to an embodiment of the present invention.

As shown in FIGS. 1 and 4, an output terminal 4 is provided at the positive cooling fin 20 of the rectifier unit 1 for outputting the electrical currents generated from the AC generator. Please refer to FIGS. 1, 2 and 4. The outer circumference 28 of the positive cooling fin 20 comprises a tongue 29 extending downward therefrom. The tongue 29 has a through hole 291 therein for being assembled with an output terminal 4 in a generally radial direction of the positive cooling fin 20. As shown in FIGS. 4 and 5, the positive cooling fin 20 has a through hole 292 in an axial direction thereof for being assembled with an output terminal 4 in an axial direction of the positive cooling fin 20.

Please refer to FIGS. 1-3. The negative cooling fin 30 of the rectifier unit 1 comprises a first negative cooling member 30a and a second negative cooling member 30b. The two negative cooling members 30a, 30b are independent from each other and are symmetrically disposed on the connection unit 10. Each of the two negative cooling members 30a, 30b is generally in the shape of an arc and is coupled to a second portion of the connection unit 10. As shown in FIG. 2, the first negative cooling member 30a has a first notch 31 corresponding to the cylinder 1422 of the second step 142 of the first terminal member 14a and a second notch 32 corresponding to the cylinder 1422 of the second step 142 of the second terminal member 14*b*. Similarly, the second negative cooling member 30*b* has a first notch 31 corresponding to the cylinder 1422 of the second step 142 of the third terminal member 14*c* and a second notch 32 corresponding to the cylinder 1422 of the second step 142 of the second terminal member 14*b*.

In coupling the first negative cooling member 30*a* to the connection unit 10, the first and second notches 31, 32 of the first negative cooling member 30*a* are respectively aligned and engaged with the corresponding cylinders 1422 of the first terminal member 14*a* and the second terminal member 14*b* of the connection unit 10. Please refer to FIGS. 2 and 3. After the first negative cooling member 30*a* is assembled to the connection unit 10, the upper surface of the first negative cooling member 30*a* contacts the lower surfaces of the second steps 142 of the first and second terminal members 14*a*, 14*b* of the connection unit 10. Similarly, in coupling the second negative cooling member 30*b* to the connection unit 10, the first and second notches 31, 32 of the second negative cooling member 30*b* are respectively aligned and engaged with the corresponding cylinders 1422 of the third terminal member 14*c* and the other second terminal member 14*b* of the connection unit 10. After the second negative cooling member 30*b* is assembled to the connection unit 10, the upper surface of the second terminal member 14*b* contacts the lower surface of the second steps 142 of the second and third terminal members 14*b*, 14*c* of the connection unit 10.

In addition, each of the first and second negative cooling members 30*a*, 30*b* has a plurality of through holes therein. In the preferred embodiment shown in FIGS. 1-3, there are three through holes 33 in each of the first and second negative cooling members 30*a*, 30*b*. After the first negative cooling member 30*a* is assembled with the connection unit 10, two through holes 33 in the first negative cooling member 30*a* are respectively disposed at two sides of the first notch 31 thereof and the two through holes 33 in the first negative cooling member 30*a* correspond to the two sides of the second step 142 of the first terminal member 14*a*. A through hole 33 is provided near the second notch 32 of the first cooling member 30*a* and corresponds to one side of the second step 142 of the second terminal member 14*b* of the connection unit 10. As shown in FIG. 1, each of the through holes 33 receives a negative-side diode 35, which is in the shape of a disc. The surface of the negative-side diode 35 in the through hole 33 is flush with the upper surface of the first negative cooling fin 30*a*. Each negative-side diode 35 received in the plurality of through holes 33 of the first negative cooling fin 30*a* has a pin 36 extending upward from the negative-side diode 35 and connects with a contact 1421 extending from a side of the second step 142 of the corresponding one of the first or second terminal members 14*a*, 14*b*.

Similarly, after the second negative cooling member 30*b* is assembled with the connection unit 10, two through holes 33 in the second negative cooling member 30*b* are respectively disposed at two sides of the first notch 31 thereof and the two through holes 33 in the second negative cooling member 30*b* correspond to the two sides of the second step 142 of the third terminal member 14*c*. A through hole 33 is provided near the second notch 32 of the second cooling member 30*b* and corresponds to one side of the second step 142 of the second terminal member 14*b* of the connection unit 10. As shown in FIG. 1, each of the through holes 33 receives a negative-side diode 35, which is in the shape of a disc. The surface of the negative-side diode 35 in the through hole 33 is flush with the upper surface of the second negative cooling fin 30*b*. Each negative-side diode 35 received in the plurality of through holes 33 of the second negative cooling fin 30*b* has a pin 36 extending upward from the negative-side diode 35 and connects with a contact 1421 extending from a side of the second step 142 of the corresponding one of the second or third terminal members 14*a*, 14*b*.

As shown in FIG. 2, a portion of an inner circumference 37 of each of the first and second negative cooling fins 30*a*, 30*b* has a jagged shape. Also, a portion of an outer circumference 38 of each of the negative cooling fins 30*a*, 30*b* has a jagged shape. These jagged shapes are for increasing the heat dissipation surface of the negative cooling fins 30*a*, 30*b*. To enhance the heat dissipation efficacy of the rectifier unit 10, a plurality of heat dissipation holes 382 are provided in the first and second negative cooling fins 30*a*, 30*b*. Furthermore, the radius of the negative cooling fin 30 composed of the first and second negative cooling fins 30*a*, 30*b* does not exceed the maximum radius of the positive cooling fin 20 so that radial dimension of the AC generator for a vehicle can be optimized and the size of the AC generator can be reduced.

In the embodiment shown in FIGS. 1 and 4, the outer circumference of the positive cooling fin 20 comprises a tongue 29 extending downward therefrom. The tongue 29 has a through hole 291 therein. The output terminal 4 is passed through the through hole 291 of the tongue 29 and is fixed thereon. The output terminal 4 comprises a bolt 41, a cylinder nut 42 and a washer 43. The bolt 41 has outer threads 411 and an end 412. The bolt 41 is radially inserted from the inner side of the tongue 29 through the through hole 291. The washer 43 is sleeved with the bolt 41 from the end 412 of the bolt 41 and is placed to be contacted with the outer surface of the tongue 29. Thereafter, the cylinder nut 42 is driven so that the inner threads of the cylinder nut 42 engage with the outer threads 411 of the bolt 41 and the cylinder nut 42 is urged to press the washer 42 to abut against the tongue 29. As such, the bolt 41 is fixed to the tongue 29 of the rectifier unit 1. The cylinder nut 42 is provided with an annular recess 422 at its outer circumference 421.

FIG. 5 shows an alternative embodiment of the present invention. In this embodiment, the output terminal 4 is vertically oriented. The output terminal 4 is passed through the through hole 292 in the positive cooling fin 20 and is fixed thereto. The bolt 41 is inserted from the side of the second surface 22 toward the side of the first surface 21 of the positive cooling fin 20 in an upward direction. The washer 43 is sleeved with the bolt 41 from the end 412 of the bolt 41 and is placed to be contacted with the first surface 21 of the positive cooling fin 20. Thereafter, the cylinder nut 42 is driven so that the inner threads of the cylinder nut 42 engage with the outer threads 411 of the bolt 41 and the cylinder nut 42 is urged to press the washer 42 to abut against the first surface 21 of the positive cooling fin 20. As such, the bolt 41 is fixed to the positive cooling fin 20 of the rectifier unit 1. The cylinder nut 42 is provided with an annular recess 422 at its outer circumference 421.

Figure 6:
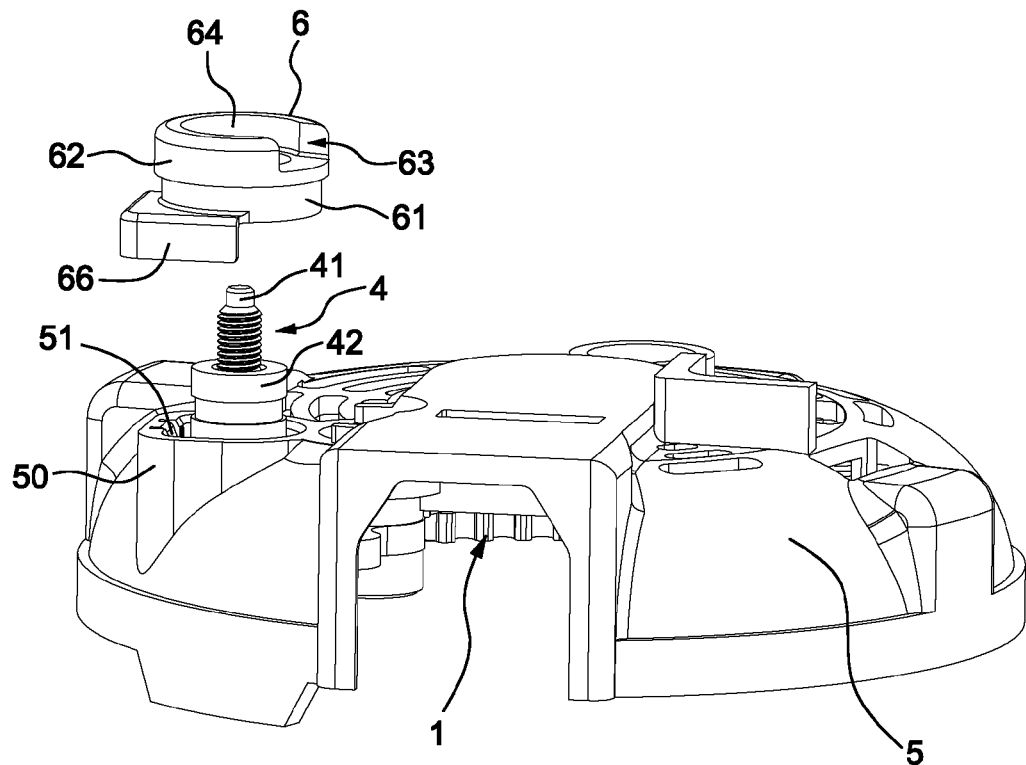
FIG. 6 is a schematic view showing a protective cover and an insulating sleeve for an output terminal of a rectifier unit according to one embodiment of the present invention.

Please refer to FIGS. 6-9. In one embodiment of the present invention, the rectifier unit 1 is substantively enwrapped in a protective cover 5 and the output terminal 4 protrudes from the protective cover 5 through an opening 51. Furthermore, the output terminal 4 is sleeved with an insulating sleeve 6 that engages with the protective cover 5 so as to prevent unintentional contact by personnel. FIG. 6 shows the structures of the protective cover 5 for enwrapping the rectifier unit 1. The protective cover 5 is configured to form the opening 51 so that a part of the bolt 41 and a part of the cylinder nut 42 protrudes from the opening 51. The opening 51 is provided in a bump 50 protruding from the top surface of the protective cover 5. The bump 50 has a generally rectangular contour.

Figure 7:
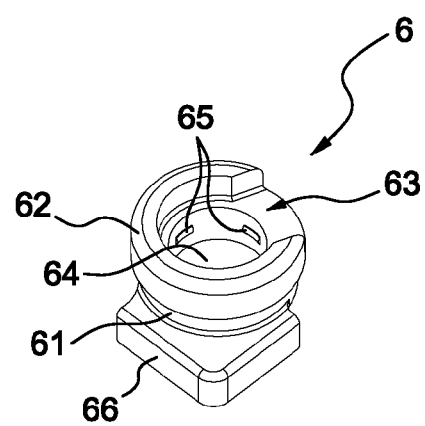
FIG. 7 is a schematic view of the insulating sleeve in FIG. 6.

FIGS. 6 and 7 show an insulating sleeve 6 from different perspectives. The insulating sleeve 6 comprises a hollow cylinder 61 with a through hole 64 therein so that the output terminal 4 can pass through the through hole 64. The hollow cylinder 61 has a flange 62 thereon and the radius of the flange 62 is preferably slightly larger than that of the hollow cylinder 61. The flange 62 has a notch 63. At least one protrusion 65, such as two protrusions 65, are provided on the inner wall of the through hole 61 in the hollow cylinder 61. The protrusions 65 are made of elastic material. Further, a hood 66 is extended downward from the outer wall of the hollow cylinder 61. The inner contour of the hood 66 matches with the outer contour of the bump 50 so that the hood 66 can be placed on and cover the bump 50.

Figure 8:
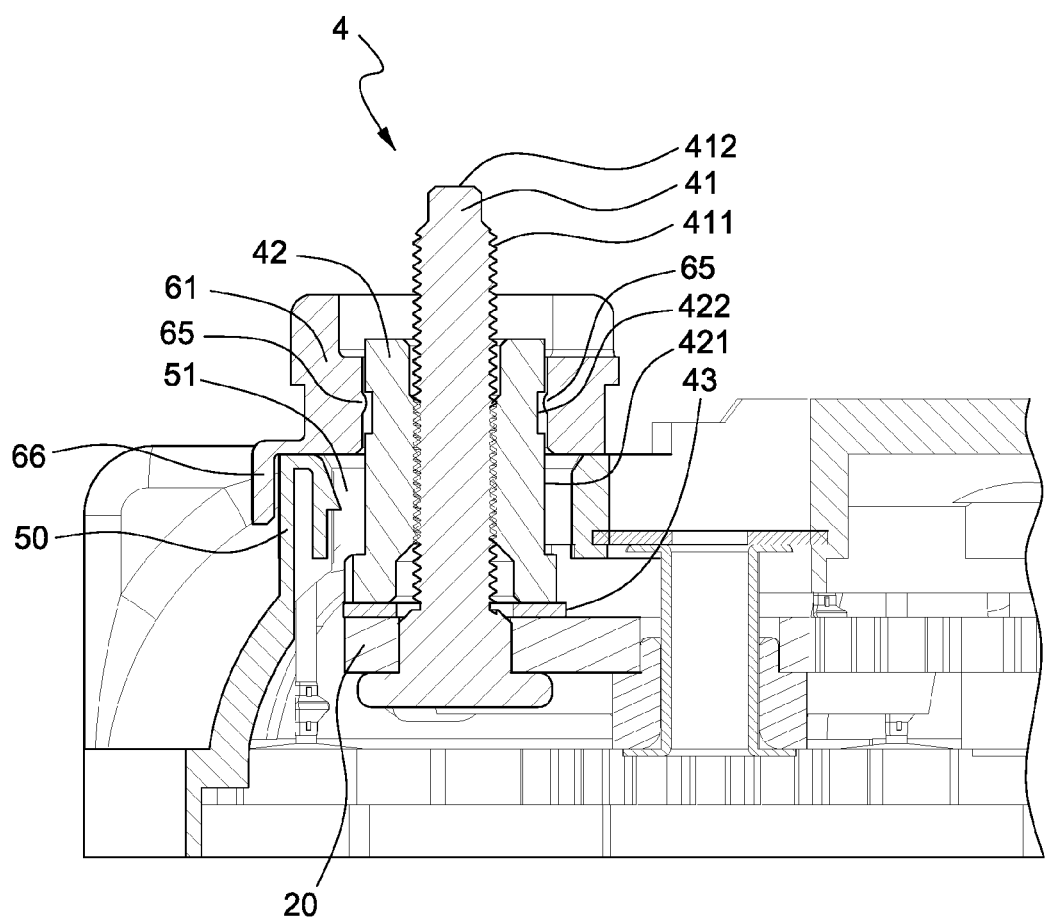
FIG. 8 is a cross sectional view of an assembly of the protective cover in FIG. 6, the insulating sleeve in FIG. 7 and the rectifier unit in FIG. 5.
Figure 9:
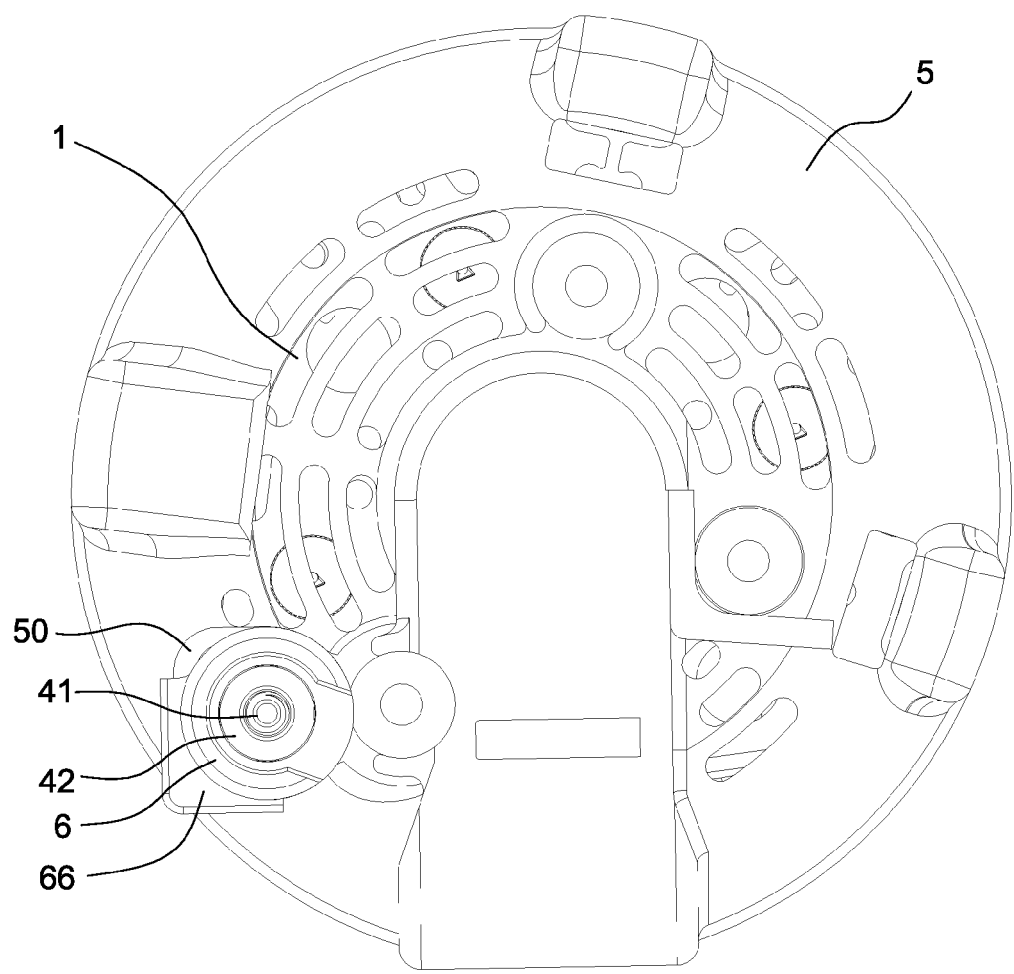
FIG. 9 is a top view of an assembly of the protective cover in FIG. 6, the insulating sleeve in FIG. 7 and the rectifier unit in FIG. 5.

FIG. 8 is a cross sectional view of an assembly of the protective cover in FIG. 6, the insulating sleeve in FIG. 7 and the rectifier unit in FIG. 5. As shown in FIG. 8, the inner diameter of the cylinder 61 of the insulating sleeve 6 is slightly larger or equivalent to the outer diameter of the cylinder nut 42 of the output terminal 4. When the insulating sleeve 6 is wrapping around the output terminal 4 and moved downward along the axial direction of the bolt 41, the outer circumference 421 of the cylinder nut 42 of the output terminal 4 deforms the elastic protrusions 65 until the elastic protrusions 65 are received in the annular recess 422 of the cylinder nut 42. That is, when the elastic protrusions 65 are received in the annular recess 422 of the cylinder nut 42, the elastic protrusions 65 return to their original shape, the insulating sleeve 6 is engaged with the output terminal 4, and the end 412 of the bolt 41 is extended outside of the top of the flange 62 of the insulating sleeve 6 from the through hole 64 of the insulating sleeve 6. Ultimately, the hood 66 of the insulating sleeve 6 is placed on and covers the bump 50 of the protective cover 5. FIG. 9 shows a top view of an assembly of the protective cover in FIG. 6, the insulating sleeve in FIG. 7 and the rectifier unit in FIG. 5. As can be seen from FIGS. 6 and 9, the outer contour of the bump 50 and the inner contour of the hood of the insulating sleeve 6 are noncircular and partially rectangular. This noncircular arrangement can prevent rotation of the insulating sleeve 6, which may cause departure of the insulating sleeve 6 from the output terminal 4 due to vibration of the engine or shaking of the vehicle. The advantage of such sleeve 6 is that it can be installed on the output terminal 4 without removing the protective cover 5 beforehand. The insulating sleeve 6 can be easily wrapped around the output terminal 4 by aligning the through hole 64 of the insulating sleeve 6 with the output terminal 4 and then pushing the insulating sleeve 6 downward until that the elastic protrusions 65 of the sleeve 6 is engaged with the annular recess 422 of the cylinder nut 42. The insulating sleeve 6 can be easily removed from the output terminal 4 by pulling it therefrom, during which the elastic protrusions 65 will be deformed and then disengaged from the annular recess 422 of the cylinder nut 42.

The foregoing embodiments are illustrative of the technical concepts and characteristics of the present invention so as to enable a person skilled in the art to gain insight into the contents disclosed herein and to implement the present invention accordingly. However, it is understood that the embodiments are not intended to restrict the scope of the present invention. Hence, all equivalent modifications and variations made to the disclosed embodiments without departing from the spirit and principle of the present invention should fall within the scope of the appended claims.

What is claimed is:

1. An output terminal for a vehicle AC generator, comprising:
   a bolt having outer threads, the bolt being inserted through a through hole of a rectifier unit; and
   a cylinder nut having inner threads therein, the inner threads of the cylinder nut engaging with the outer threads of the bolt so that the cylinder nut surrounds the outer circumference of the bolt and fixes the bolt to the rectifier unit, the cylinder nut having a recess in its outer circumference.

2. The output terminal according to claim 1, wherein the recess is an annular recess formed along the outer circumference of the cylinder nut.

3. An assembly, comprising:
   the output terminal of claim 1; and
   an insulating sleeve having a through hole therein for being wrapped around the output terminal wherein an end of the bolt is exposed outside of the insulating sleeve.

4. The assembly according to claim 3, wherein at least one protrusion is provided on the inner wall of the through hole of the insulating sleeve and is received within the recess of the cylinder nut so that the insulating sleeve is mounted to the output terminal.

5. The assembly according to claim 4, wherein the recess is an annular recess formed along the outer circumference of the cylinder nut.

6. The assembly according to claim 5, wherein the at least one protrusion is an annular protrusion formed along the inner circumference of the insulating sleeve and the annular protrusion is received within and engaged with the annular recess formed along the outer circumference of the cylinder nut.

7. The assembly according to claim 6, wherein the annular protrusion is elastic and deformable.

8. An assembly, comprising:
   the output terminal of claim 1
   a protective cover for enwrapping the rectifier unit, the output terminal protruding from the protective cover through an opening thereof; and
   an insulating sleeve having a through hole therein for being wrapped around the output terminal and an end of the bolt being exposed outside of the insulating sleeve.

9. The assembly according to claim 8, wherein at least one protrusion is provided on the inner wall of the through hole of the insulating sleeve and is received within the recess of the cylinder nut so that the insulating sleeve is mounted to the output terminal.

10. The assembly according to claim 9, wherein the recess is an annular recess formed along the outer circumference of the cylinder nut.

11. The assembly according to claim 10, wherein the at least one protrusion is an annular protrusion formed along the inner circumference of the insulating sleeve and the annular protrusion is received within and engaged with the annular recess formed along the outer circumference of the cylinder nut.

12. The assembly according to claim 11, wherein the annular protrusion is elastic and deformable.

13. The assembly according to claim 12, wherein protective cover is configured to form the opening so that a part of the bolt and a part of the cylinder nut protrudes from the opening.

14. The assembly according to claim 13, wherein the protective cover has a bump protruding from the top surface of the protective cover and the opening is provided in the bump.

15. The assembly according to claim 14, wherein the insulating sleeve has a hood provided at the outer wall thereof and the hood extends downward so that the hood covers the bump.

\* \* \* \* \*